US008050962B2

(12) United States Patent
Worcester

(10) Patent No.: US 8,050,962 B2
(45) Date of Patent: Nov. 1, 2011

(54) METHODS AND APPARATUS FOR PROVIDING MISSION ASSURANCE

(75) Inventor: Michael S. Worcester, Orange, CA (US)

(73) Assignee: The Boeine Company, Chicago, IL (US)

(*) Notice: Subject to any disclaimer, the term of this patent is extended or adjusted under 35 U.S.C. 154(b) by 2199 days.

(21) Appl. No.: 11/117,885

(22) Filed: Apr. 29, 2005

(65) Prior Publication Data

US 2006/0247988 A1 Nov. 2, 2006

(51) Int. Cl.
*G06Q 10/00* (2006.01)

(52) U.S. Cl. ................ 705/7.39; 705/7.37; 705/7.13

(58) Field of Classification Search ............ 705/7, 7.13, 705/7.37, 7.39
See application file for complete search history.

(56) References Cited

U.S. PATENT DOCUMENTS

| 6,321,206 B1 * | 11/2001 | Honarvar | 705/7 |
| 6,556,974 B1 * | 4/2003 | D'Alessandro | 705/10 |

OTHER PUBLICATIONS

Kakita, Howard; Yu, Edward; "Improving Process Maturity to Compete in the Desktop Printer Market", Apr. 1998, PDMA Visions Magazine, pp. 1-8.*
Maturity and its Impact on New Product Development Project Performance☐☐Kevin Dooley; Anand Subra, John Anderson, 2001, Research in Engineering Design, 13; 23-29.*
A stage maturity model for enterprise resource planning systems use☐☐Christopher P Holland, Ben Light. Database for Advances in Information Systems. New York: Spring 2001. vol. 32, Iss. 2; p. 34, 12.*
Resolving the process paradox☐☐Robert A Gardner. Quality Progress. Milwaukee: Mar. 2001. vol. 34, Iss. 3; p. 51, 9 pgs.*
Can cost management benefit from an industry standard process capability model? Other disciplines have! Anonymous. The CPA Letter. New York: Feb./Mar. 2000. vol. 80, Iss. 2; p. D3, 1 pgs.*
Information technology metrics Betty Vivant. The Journal of Bank Cost & Management Accounting. San Francisco: 1999. vol. 12, Iss. 3; p. 11, 28 pgs.*
Process performance measurement system: A tool to support process-based organizations Peter Kueng. Total Quality Management. Abingdon: Jan. 2000. vol. 11, Iss. 1; p. 67, 19 pgs.*
Measure success Noah Schachtman. InformationWeek. Manhasset: Oct. 26, 1998. , Iss. 706; p. 103, 3 pgs.*
Harnessing the power of intellectual capital. (includes glossary and list of reference materials) Bassi, Laurie J. Training & Development, v51 , n12, p25(6) Dec. 1997, Dialog 10018565 Supplier No. 20251749.*
Setting the PACE in Product Development: A Guide to Product and Cycle Time Excellence McGrath, Michael; Butterworth Heinemann, 1995, pp. 1-177.*
Nawrocki, et al; "Extreme programming modified: embrace requirements engineering practices": Requirements Engineering, 2002. Proceedings. IEEE Joint International Conference, Publication Date: 2002, pp. 303-310.*

* cited by examiner

*Primary Examiner* — Jonathan G Sterrett

(74) *Attorney, Agent, or Firm* — Yee & Associates, P.C.

(57) ABSTRACT

Methods and apparatus are provided for assuring content of a product. The method comprises identifying key elements that at least partially specify the content of the product creating assessment criteria for each of the key elements, and defining maturity levels for each of the assessment criteria. The method further comprises developing a planned maturity level for each of said assessment criteria that comprise a relationship between the maturity and the maturity levels and conducting evaluations of the assessment criteria with at least the planned maturity level to determine a plurality of metrics for each of the assessment criteria that at least partially corresponds to the maturity of the content. In addition, the method comprises projecting a future maturity level for at least one of the assessment criteria based at least in part upon a statistical analysis of the metrics of the at least one of the assessment criteria and identifying issues with the content of the product based at least in part upon the future maturity level.

19 Claims, 3 Drawing Sheets

METHODS AND APPARATUS FOR PROVIDING MISSION ASSURANCE

TECHNICAL FIELD

The present invention generally relates to product development, and more particularly relates to methods of assuring that the content of a product at least partially meets the design requirements specified for the product (i.e., mission assurance).

BACKGROUND

Mission assurance is an important component of any product development. It is the process that ensures that the content of a product, which can include product quantity, quality and performance, is sufficient to meet customer, manufacturer, and/or supplier needs through out the product's life cycle (i.e., inception to disposal). Mission assurance is generally about doing it right the first time, and the end result of a product that is sought under a mission assurance program is the right product, the first time, at the best value for the customer, the manufacturer, and/or supplier.

Mission assurance methods differ depending on the involvement of individuals and organizations. However, these methods typically follow a general pattern. The general pattern most often involves assessment of product content by independent reviewers using one or more assessment criteria defined as a function of the content under review and the ability and experience of the independent reviewers.

There are many different reviews that focus on different aspects of product content; as such there are also many different independent review teams or groups. The reviews are temporally spaced and aperiodic in nature and result in a further diversity of review team membership. Diversity in review team membership and assessment criteria is typically viewed as a positive characteristic, as the diversity produces a multiplicity of views with respect to content. Integration of these independent reviews produces an overall picture of product content as a function of time.

While existing mission assurance methods are beneficial to product development, the current focus is limited to producing the right product with limited attention focused on the first time or best value aspects. Existing mission assurance programs fail to provide a method that can track and correct non-optimal maturation of product content in near real time. The current methods of Mission Assurance can not effectively address these issues due to the low sample rate and less than consistent evaluation techniques.

Accordingly, it is desirable to provide methods for assuring content of a product that address the limitations as expressly or impliedly set forth and other limitations not expressly or impliedly set forth in this background or subsequent detailed description. In addition, it is desirable to provide an apparatus or program product that address the limitations as expressly or impliedly set forth and other limitations not expressly or impliedly set forth in this background or subsequent detailed description. Furthermore, other desirable features and characteristics of the present invention will become apparent from the subsequent detailed description and the appended claims, taken in conjunction with the accompanying drawings and the foregoing technical field and background.

BRIEF SUMMARY

A method of assuring content of a product is provided in accordance with an exemplary embodiment of the present invention. The method comprises identifying key elements that at least partially specify the content of the product, creating assessment criteria for each of the key elements and defining maturity levels for each of the assessment criteria that are used to at least partially assess a maturity of the content. The method also comprises developing a planned maturity level for each of the assessment criteria that comprise a relationship between the maturity and the maturity levels, conducting evaluations of the assessment criteria with at least the planned maturity level to determine metrics for each of the assessment criteria that at least partially corresponds to the maturity. The method further comprises projecting a future maturity level based at least in part upon an analysis of at least one of the metrics of at least one of the assessment criteria and identifying issues with the content based at least in part upon the future maturity level.

In accordance with one exemplary embodiment of the present invention, the evaluations of the assessment criteria comprise three steps. More specifically, determining an actual maturity level for the assessment criteria, identifying a difference between the actual maturity level and the planned maturity level, and creating at least one of the of metrics based at least in part upon the difference. After the evaluations are conducted and metrics are produced for the assessment criteria utilizing theses three steps, or these three steps, in addition to other steps, the method of assuring content of the product continues with projection of a future maturity level for at least one of the assessment criteria based at least in part upon an analysis, which is preferably a statistical analysis, of the metrics and identifying issues with the content of the product based at least in part upon the future maturity level.

In addition to the method of assuring a content of a product, an apparatus is also provided for assuring a content of a product in accordance with an exemplary embodiment of the present invention. The apparatus comprises a memory configured to store the following: at least one of the key elements that at least partially specify the content of the product, assessment criteria for each of the key elements; maturity levels for each of the assessment criteria; a planned maturity level for each of the assessment criteria that comprise a relationship between the maturity and the plurality of maturity levels; actual maturity levels for each of the assessment criteria that are based at least in part on the assessments of each of the assessment criteria; a difference between the actual maturity levels for each of the assessment criteria and the planned maturity level for each of the assessment criteria; a metric based at least in part upon the difference for each of the assessment criteria; and a future maturity level for at least one of the assessment criteria based at least in part upon a statistical analysis of the metrics of the at least one of the assessment criteria. The apparatus also comprises an output device configured to present feedback based at least in part upon the future maturity level and a processor coupled to the memory and the output device. The processor is configured to calculate the difference between the actual maturity levels for each of the assessment criteria and the planned maturity level for each of the assessment criteria, determine a future maturity level for at least one of the assessment criteria based at least in part upon a statistical analysis of the metrics of the at least one of the assessment criteria stored in the memory, and generate the feedback for presentation by the output device for at least partial use in identifying issues with the content of the product.

In addition to the method and apparatus for assuring a content of a product, a program product is provided in accordance with an exemplary embodiment of the present invention. The program product comprises software executable in a processor. The software is executable to store the following: key elements that at least partially specify the content of the product; an assessment criteria for each of the key elements; maturity levels for each of the assessment criteria that are used to at least partially assess a maturity of the content; a planned maturity level for each of the assessment criteria that comprise a relationship between the maturity and the maturity levels, and an actual maturity level for the assessment criteria. The software is further executable to calculate a difference between the actual maturity level and the planned maturity level of the assessment criteria, create at least one of the metrics based at least in part upon the difference, project a future maturity level for at least one of the assessment criteria based at least in part upon an analysis of the metrics of at least one of the assessment criteria, and identify issues with the content of the product based at least in part upon the future maturity level. Lastly, the program product comprises signal-bearing media bearing the software.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
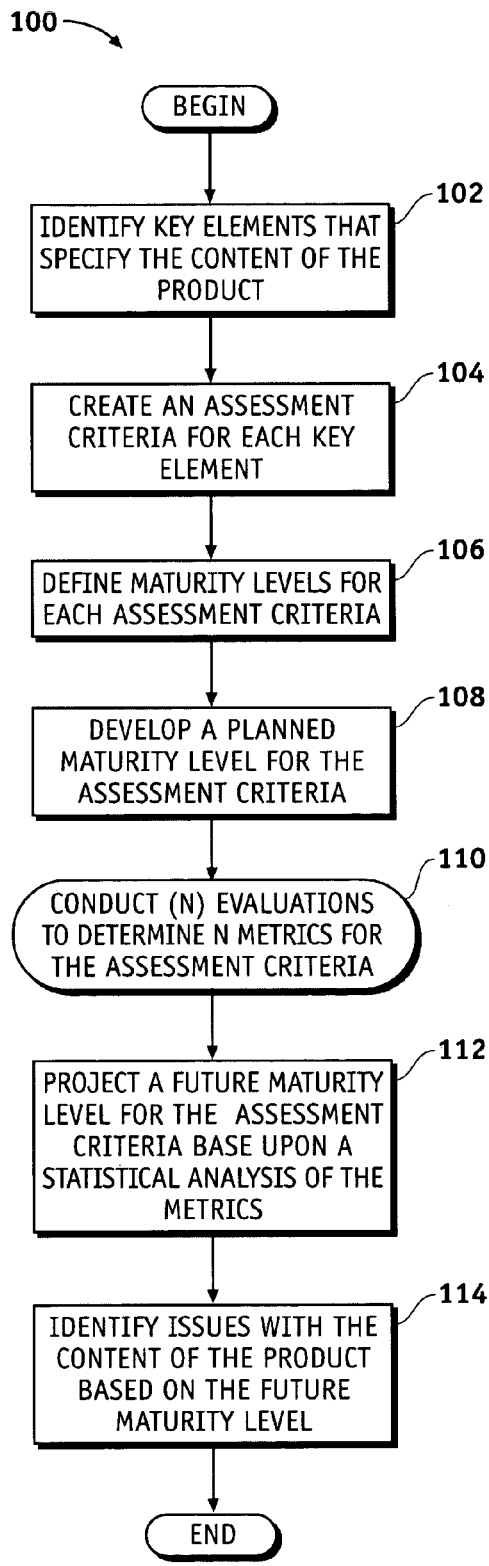
FIG. 1 is a flowchart for the method of assuring content of a product in accordance with an exemplary embodiment of the present invention.

Referring to FIG. 1, a method of assuring content of a product (i.e., mission assurance) 100 is generally illustrated in accordance with an exemplary embodiment of the present invention. The method 100 can be performed to assure all product content or less than all the product content. In addition, the content can be specified in terms or quantity, quality, performance, or a combination of two or more of quantity, quality, and performance. Moreover, the method 100 can be performed to assure, or at least partially assure, the content of any number of articles or services produced by human industry or art or a combination of human industry and art. For example, the method 100 can be performed to provide assurance of hardware, software, firmware, service, or a combination of two or more of these products.

In order to provide content assurance for a product, the method 100 includes, but is not limited to, identification of key elements that at least partially specify the content of the product 102 and creating assessment criteria for the key elements 104. The method 100 also includes, but is not limited to, defining maturity levels for the assessment criteria 106 that are used to at least partially assess a maturity of the product content, developing a planned maturity level for the assessment criteria with the planned maturity level at least having a relationship between the maturity and the maturity levels 108, and conducting a number (N) of evaluations of the assessment criteria with at least the planned maturity level to determine N metrics that at least partially correspond to the maturity 110.

Figure 2:
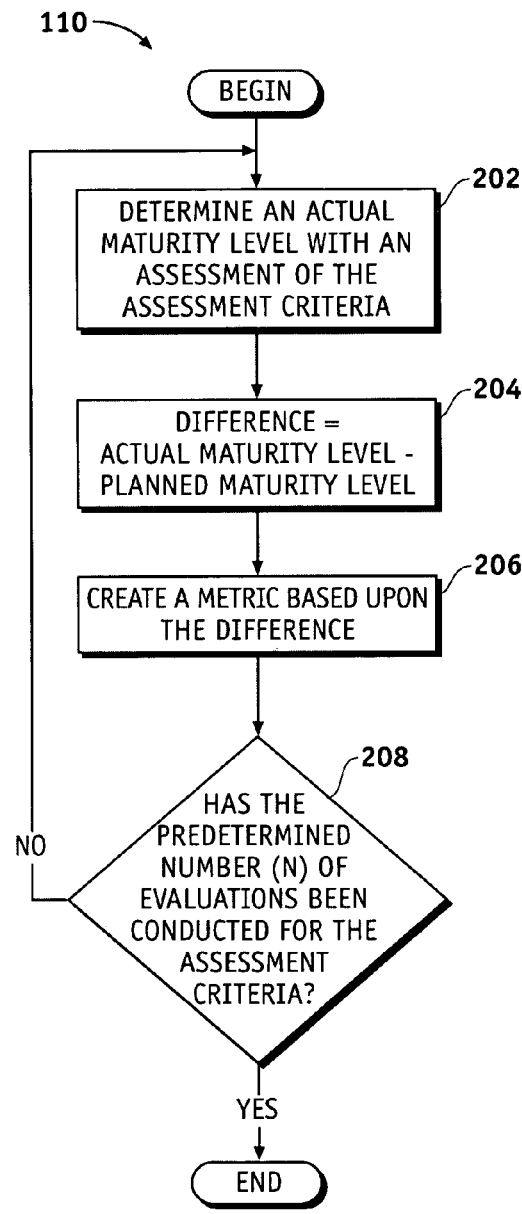
FIG. 2 is a flowchart for conducting a number (N) of assessment criteria to determine N metrics for the assessment criteria in accordance with an exemplary embodiment of the present invention.

Referring to FIG. 2, the method of conducting the N evaluations 110 is illustrated in accordance with an exemplary embodiment of the present invention. The method 110 includes, but is not limited to, determining an actual maturity level with an assessment of the assessment criteria 202, identifying a difference between the actual maturity level and the planned maturity level 204, and creating a metric based at least in part upon the difference between the actual maturity level and the planned maturity level 206. After a metric is created based upon the difference 206, a query is made to determine if the N metrics have been created with the N evaluations for the assessment criteria 208. If the N evaluations have not been conducted for the assessment criteria, the method 110 repeats. However, if the N evaluations have been conducted for the assessment criteria, the method 110 returns to the method 100 for additional steps associated with assuring content of the product.

More specifically, and with continuing reference to FIG. 1, the method 100 continues with a projection of a future maturity level for at least one of the assessment criteria based at least in part upon an analysis of the N metrics 112 and identifying issues with the content of the product based at least in part upon the future maturity level 114. These two steps can be performed concurrently, substantially concurrently, and performed in an alternate order. Furthermore, the two steps can be performed by one or more humans or wholly or partially conducted by an apparatus or more than one apparatus. In addition, the other steps of the method 100 of FIG. 1 and the method 200 of FIG. 2 can be performed concurrently, substantially concurrently, and performed in an alternate order. Moreover, the other steps of the method 100 of FIG. 1 and the method 200 of FIG. 2 can be performed by one or more humans or wholly or partially conducted by an apparatus or more than one apparatus.

Figure 3:
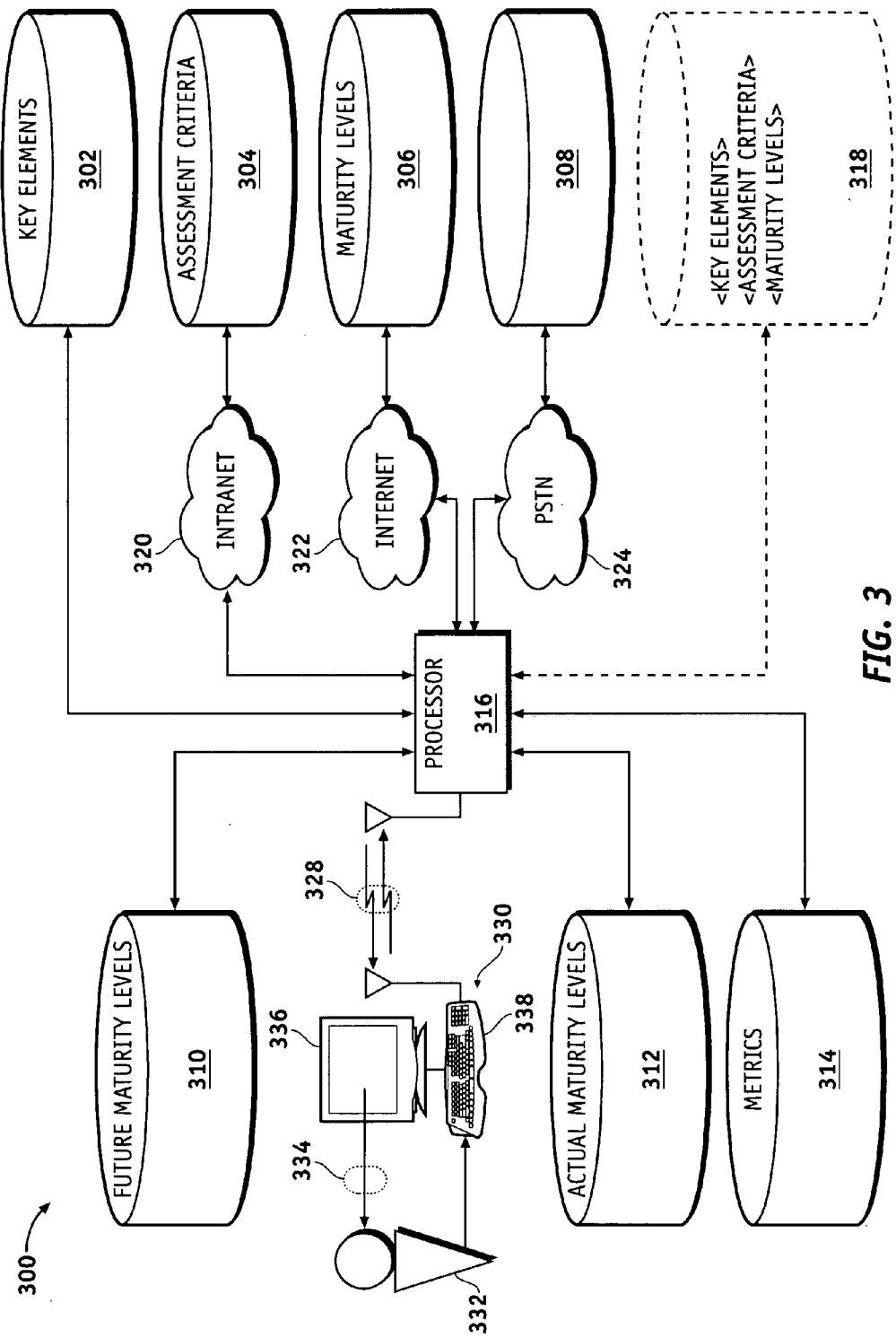
FIG. 3 is an apparatus for assuring content of a product in accordance with an exemplary embodiment of the present invention.

For example, and with reference to FIG. 3, an apparatus 300 is illustrated for assuring content of a product in accordance with one exemplary embodiment of the invention. The apparatus 300 includes, but is not necessarily limited to, a memory 302 and a processor 304 in operable communication with multiple memories (302, 304,306,308,310,312,314). Alternatively, the apparatus 300 can comprise a single memory 318 in operable communication with the processor 316 or multiple processors (not shown).

The subsequent description of the apparatus 300 and components of the apparatus 300, such as the processor 316, the single memory 318, or the multiple memories (302, 304,306, 308,310,312,314), may be described in this detailed description in terms of functional and/or logical block components and various processing steps. However, it should be appreciated that such block components may be realized by any number of hardware, software, and/or firmware components configured to perform the specified functions. For example, an exemplary embodiment of the processor 316 may employ various integrated circuit components (e.g., memory elements, digital signal processing elements, logic elements, look-up tables, or the like), which may carry out a variety of functions under the control of one or more microprocessors or other control devices. However, conventional techniques related to signal processing, data transmission, signaling, network control, and other functional aspects of the systems, and the individual operating components of the systems, may not be described in this detailed description for the sake of brevity. Furthermore, the connecting lines shown in the various figures contained herein are intended to represent example functional relationships and/or couplings between the various elements. It should be noted that many alternative or additional functional relationships or physical coupling may be present in a practical embodiment.

More specifically, an exemplary embodiment of the invention may be practiced in conjunction with any number of couplings or combination of couplings that provide the operable communication between the processor 316 and the one or more memories and also utilize any number of transmission protocols. For example, the memory 318 and/or the multiple memories (302, 304, 306, 308, 310, 312, 314) can be in operable communication with the processor 316 and/or other processors with an intranet connection 320 (i.e., a privately maintained computer network that has limited accessed for authorized persons such as members or employees of an organization that owns the intranet), an internet connection 322 (i.e., an interconnected system of networks that connects computer or computer systems around the world via a Transmission Control Protocol/Internet Protocol (TCP/IP) protocol), a Public Switched Telephone Network (PSTN) 324, other wired connection 326 or a combination of these connection examples. Alternatively, a wireless connection 328 can be utilized to provide the operable communication between the processor and/or other processors and the memory and/or the multiple memories (302, 304, 306, 308, 310, 312, 314) of the apparatus 300 or other components of the apparatus 300.

For example, the apparatus 300 includes, but is not necessarily limited to, an Input/Output (I/O) device 330 that is configured to receive commands and/or data from a user 332 of the apparatus 300 and also preferably provide feedback 334 to the user 332. Any number of I/O device or combination of I/O devices can be used to receive commands and/or data from the user 332 and provide the feedback 334. For example, feedback 334 can be provided with an output device 336 such as a printer and/or a display and input can be provided with an input device 338 such as a keyboard, light pen, data tablet, mouse, scanner, trackball, and/or voice. As subsequently described in this detailed description, the I/O is preferably configured to receive data generated or observed by one or more user or provide feedback to one or more users for assuring the content of a product.

In accordance with an exemplary embodiment of the present invention, the user individually identifies the key elements that at least partially specify the content of the product and enters the key elements with the input device for storage in the memory 302. Generally, the key elements are components, parts or qualities of the product that are product specific and the key elements are often, but not necessarily, a basic or essential component, part or quality of the product, which are expressed as requirements that the developed, produced or operated product is expected to satisfy in whole or in part. The number of key elements and the corresponding complexity and breadth of the key elements is a typically a function of the product. For example, a missile system generally has a significantly greater number of complex key elements as compared to a pencil, but the pencil may have broader key elements as compared to the missile systems (e.g., the pencil must function in a very broad set of environments compared to a missile system).

Key elements can be product specific or common to numerous products. For example, a key element for a cellular telephone that is specific to this product could be "interoperability," which is generally an important component of cellular telephones, but not very significant for a pencil. Alternatively, a significant number of products have key elements that are common such as requirements management, risk, baseline control (i.e., configuration management), closed loop corrective action, cost & schedule, verification & validation, integration & test, software, supplier management, and safety and technology. Accordingly, the applicable key elements for a product are a function of the product as defined by the customer, supplier, end user, and/or manufacturer and any number of key elements can be individually identified that at least partially specify the content of the product, which can be stored in memory as previously described in this detailed description.

To determine applicability of a key element to a particular product, assessment criteria are created and entered by the user 332 via the input device 338 and stored in memory 304. These assessment criteria are evaluated for significance with respect to the product by any number of individuals or groups that have domain expertise and experience with respect to the product (e.g., customer, supplier, external consultant, etc.). The assessment criteria can take on any number of forms that allow the individual or group to estimate or determine the significance, importance or value of the key element (i.e., evaluate the key element). For example, if the product is airborne radar in a development phase, and one of the key elements is risk, assessment criteria as shown in Table 1 can be created for this key element. The partial assessment criterion for risk in this example is focused on assessing the content of the identified risk for a product (i.e., is certainty needed that the airborne radar is tracking and mitigating the real risks?).

TABLE 1

| | |
|---|---|
| ≈3–4 | Substantially all or all of the critical technical risk have been identified and/or captured by the risk management process. Substantially all or all of the risk mitigation plans are practical and/or can be accomplish without some new technical breakthrough. Substantially all or all of the identified risks are stable (i.e., likely not to change). |
| ≈2–3 | Most of the critical technical risk have been identified and/or captured by the risk management process. Most of the risk mitigation plans are practical and/or can be accomplish without some new technical breakthrough. Most of the identified risks are stable (i.e., likely not to change). |
| ≈1–2 | Some of the critical technical risk have been identified and/or captured by the risk management process. Some of the risk mitigation plans are practical and/or can be accomplish without some new technical breakthrough. Some of the identified risks are stable (i.e., likely not to change). |
| ≈0–1 | Few of the critical technical risk have been identified and/or captured by the risk management process. Few of the risk mitigation plans are practical and/or can be accomplish without some new technical breakthrough. Few of the identified risks are stable (i.e., likely not to change). |

Figure 4:
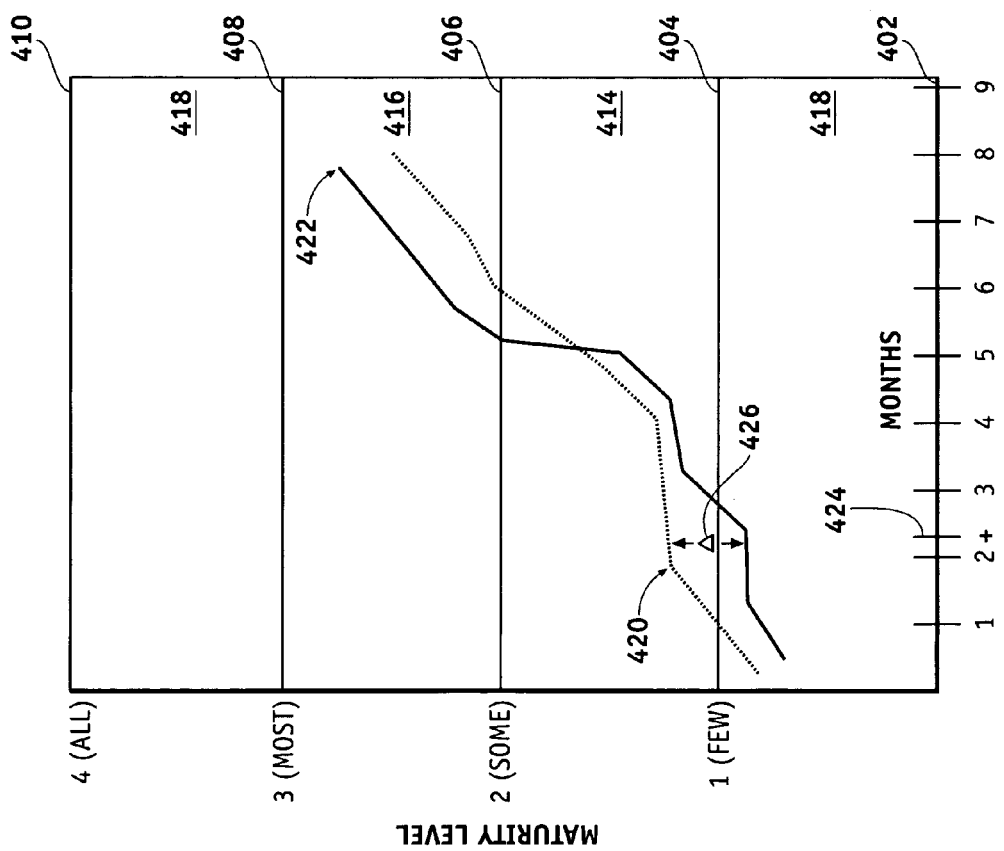
FIG. 4 is an exemplary illustration of maturity levels for an assessment criteria that includes a planned maturity level and actual maturity level in accordance with an exemplary embodiment of the present invention.

Once the assessment criteria are created for each of the identified key elements, maturity levels are preferably defined for each of the assessment criteria, which can be used to at least partially assess a maturity of the content. In accordance with one exemplary embodiment, the maturity levels are defined by a single individual or multiple individuals and entered by the user 332 via the input device 338 and stored in memory 306. As shown in FIG. 4, and with continued risk as the assessment criteria, maturity levels are defined in a qualitative fashion. The maturity levels (402, 404, 406, 408, 410) are preferably defined in an escalating manner in order to define ranges that are substantially related to the maturity of the content. For example, the four maturity levels (402,404,406, 408,410) of FIG. 4 are defined in order to specify four ranges (412,414,416,418) with zero (0) representing no mature content and four (4) representing completely mature content. In addition, while four maturity levels are provided in the example illustrated in FIG. 4, fewer or greater than four maturity levels can be defined for assessment criteria in accordance with the present invention. Nevertheless, the maturity levels preferably mimic the typical maturation of the content such that the maturity levels for the assessment criteria can be used to at least partially assess the maturity of the content (i.e., the content maturity associated with the key element is assessed with the assessment criteria on a graduated scale).

Once the maturity levels are defined for each of the assessment criteria, a planned maturity level 420 is developed that comprise a relationship between the maturity of the content and the maturity levels (402,404,406,408,410). The planned maturity level for an assessment criterion is developed by a single individual or multiple individuals and entered by the user 332 via the input device 338 and stored in memory 306. The maturity plan is preferably developed by an individual or multiple individuals based upon previous experiences and need as experience typically provides the bounds on how quickly content can be matured for a particular product and need typically bounds the time frame allowed for maturation of the content (e.g., about 8 months as shown in FIG. 4). The maturity plan preferably takes these two factors into consideration to develop the planned maturity level as a function of time. It is generally preferable to develop the planned maturity level such that at least some maturity level 406 is reached within the given time frame, more preferable to develop the planned maturity level within the given time frame such that the most maturity level 408 is reached within the given time frame. It is generally even more preferable to develop the planned maturity level such that at least the most maturity level 408 is exceed within the given time frame and most preferable to develop the planned maturity level such that the all maturity level 410 is substantially reached, reach, or exceeded within the given time frame. However, the planned maturity level can be developed to meet any number of maturity levels within the given time frame and other factors can be solely used to develop the maturity plan or other factors can be used to develop the planned maturity level with one or both of experience and need.

The planned maturity level is preferably used in conducting evaluations to determine metrics for the assessment criteria. The evaluations are preferably conducted by a single individual or multiple individuals on at least a substantially periodic basis and conducted at a frequency that is needed to support the statistical analysis of the metrics as subsequently described in this detailed description. The frequency can be selected such that the evaluations are generally conducted on an hourly basis, daily basis, weekly basis, monthly basis, or yearly basis, depending on the overall length of the product development cycle. However, while the evaluations are preferably periodic or substantially periodic, the evaluations can be non-periodic basis or a combination or period and non-periodic evaluations if such a non-periodic and/or periodic intervals are conducted at a specific frequency that supports the analysis.

Generally, the evaluations for an assessment criterion begin with one or more individuals determining an actual maturity level 422 as shown in FIG. 4. The actual maturity level 422 at a given time (t) 424 is preferably entered by the user 332 via the input device 338 and stored in memory 308 as shown in FIG. 3. Referring to FIG. 4, the processor preferably calculates a difference ($\Delta$) 426 between the actual maturity level 422 and the planned maturity level 420 at the given time (t) 424, and a metric is preferably created based at least in part on the difference ($\Delta$) 426.

The actual maturity level that is initially determined in the assessment criterion evaluation is preferably gained with first hand knowledge of the current state of product maturity at the time of the evaluation. This is accomplished using any number of techniques or processes. For example, the actual maturity level can be determined with an examination of quantitative data associated with the assessment criterion or examination of in-progress work product.

The difference ($\Delta$) can be a subtraction of the value of the actual maturity level from the value of the planned maturity level. Alternatively, the difference can be a subtraction of the value of the planned maturity value from the value of the actual maturity value. As previously described in this detailed description, this difference can be used to obtain one metric or multiple metrics for the assessment criterion in order to project a future maturity level based upon an analysis of at least one of the metrics.

The analysis of a metric can used in a discrete fashion at each sample point to assist with the identification of product areas that need attention based upon an evaluation of the future maturity level. For example, the metric created from the difference can be the difference magnitude ($|\Delta|$) and the analysis of the difference magnitude can be a comparison with previous difference magnitudes to determine the current level of need. As another example, the metric created from the difference can be the first derivative of the difference and the analysis of the first derivative can be utilized to determine if the rate of change of the need is increasing or decreasing. In yet another example, metric created from the difference can be the first derivative and the analysis of the first derivative can be utilized to project the current maturity level forward as a prediction of as a function of time, which provides any number of advantages such as implementation of longer term corrections strategies.

In accordance with a preferred exemplary embodiment of the invention, the analysis of the metrics to project the future maturity level is a statistical analysis. This statistical analysis can be any number of statistical analysis techniques. For example, the statistical analysis can be a linear extrapolation or a complex Kalaman Filter. Nevertheless, the frequency of the evaluations of the assessment criteria to determine the metrics and project a future maturity level based upon the metrics is preferably at least twice the rate of the change that is being implemented by the product team as a result of the measurement itself. Accordingly, the Nyquist criterion is satisfied in accordance with the present invention. In this manner, the issues with the content of the product that are identified based at least in part on the future maturity level provide increased accuracy and meaning.

The issues that can be identified based at least in part on the future maturity level as a forward looking metric are numerous. For example, future maturity level can be used to identify an excessive work load or assist with the redistribution of work to support a product maturity in a cost effective manner. The future maturity level can also be utilized to identify the critical skills that will be necessary in the future for maturing the content of the product. However, numerous issues can be identified with any number of future maturity level variations as a forward looking metric in the method of assuring content of a product and the apparatus for assuring content of a product in accordance with the exemplary embodiments of the present invention, and these methods and apparatus can be used by separate entities in a product assurance setting or used by one entity while another entity uses a different product assurance method and/or apparatus.

Figure 5:
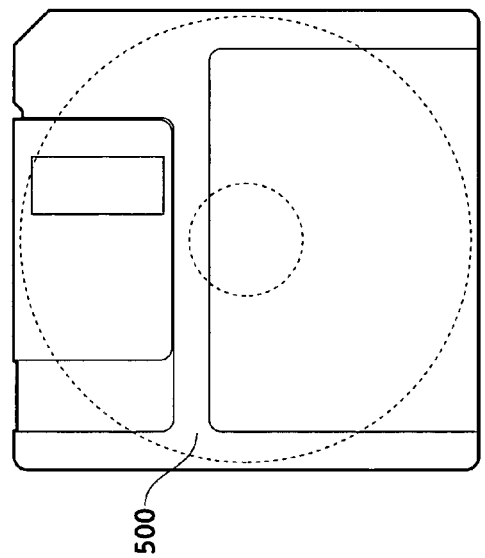
FIG. 5 is an example of a program product in accordance with an exemplary embodiment of the present invention.

While the apparatus 300 previously presented is described in the context of a fully functioning computer system, the mechanisms of the present invention are capable of being distributed as a program product in a variety of forms, and the present invention applies equally regardless of the particular type of signal bearing media used to carry out the distribution. Examples of signal bearing media include: recordable media such as floppy disk 500 shown in FIG. 5, hard drives, memory cards and optical disks, other magnetic disks or memory storage, and transmission media such as digital and analog communication links, including wireless communication links. Furthermore, while multiple exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A method of assuring content of a product, comprising:
   identifying a plurality of key elements that at least partially specify the content of the product;
   creating an assessment criteria for each of said plurality of key elements;
   defining a plurality of maturity levels for each of said assessment criteria that are used to at least partially assess a maturity of said content;
   developing a planned maturity level for each of said assessment criteria that comprise a relationship between said maturity of said content and said plurality of maturity levels;
   conducting a plurality of evaluations of said assessment criteria with at least said planned maturity level to determine a plurality of metrics for each of said assessment criteria that at least partially corresponds to said maturity of said content;
   projecting, by a processor, a future maturity level based at least in part upon an analysis of at least one of said plurality of metrics of at least one of said assessment criteria; and
   identifying issues with said content of the product based at least in part upon said future maturity level.

2. The method of assuring content of the product according to claim 1, wherein said plurality of evaluations comprise:
   determining an actual maturity level for said assessment criteria;
   identifying a difference between said actual maturity level and said planned maturity level for said assessment criteria; and
   creating at least one of said plurality of metrics based at least in part upon said difference.

3. The method of assuring content of the product according to claim 1, wherein said content is at least specified in terms of quality.

4. The method of assuring content of the product according to claim 1, wherein said product is at least partially a hardware product.

5. The method of assuring content of the product according to claim 1, wherein said identifying said plurality of key elements that at least partially specify the content of the product occurs after said creating an assessment criteria for each of said plurality of key elements.

6. The method of assuring content of the product according to claim 1, wherein one of said key elements is configuration management.

7. The method of assuring content of the product according to claim 1, wherein said plurality of maturity levels comprise at least four (4) maturity levels.

8. The method of assuring content of the product according to claim 1, wherein said plurality of maturity levels are defined in an escalating manner.

9. The method of assuring content of the product according to claim 1, wherein said plurality of evaluations are conducted on a substantially periodic basis.

10. The method of assuring content of the product according to claim 1, wherein said plurality of evaluations are conducted on a substantially daily basis.

11. The method of assuring content of the product according to claim 1, wherein said analysis is a statistical analysis.

12. The method of assuring content of the product according to claim 11, wherein said statistical analysis is a linear extrapolation.

13. An apparatus for assuring content of a product, comprising:
   a memory configured to store at least one of:
      a plurality of key elements that at least partially specify the content of the product;
      assessment criteria for each of said plurality of key elements;
      a plurality of maturity levels for each of said assessment criteria that are used to at least partially assess a maturity of said content;
      a planned maturity level for each of said assessment criteria that comprise a relationship between said maturity of said content and said plurality of maturity levels;
      a plurality of actual maturity levels for each of said assessment criteria that are based at least in part on a plurality of assessments of each of said plurality of assessment criteria;
      a difference between said plurality of actual maturity levels for each of said assessment criteria and said planned maturity level for each of said assessment criteria;
      a metric based at least in part upon said difference for each of said assessment criteria; and
      a future maturity level for at least one of said assessment criteria based at least in part upon a statistical analysis of said plurality of metrics of said at least one of said assessment criteria;
   an output device configured to present feedback based at least in part upon said future maturity level;
   a processor coupled to said memory, said processor configured to:
      calculate said difference between said plurality of actual maturity levels for each of said assessment criteria and said planned maturity level for each of said assessment criteria;
      determine a future maturity level for at least one of said assessment criteria based at least in part upon an analysis of said plurality of metrics of said at least one of said assessment criteria stored in said memory; and
      generate said feedback for presentation by said output device for at least partial use in identifying issues with said content of the product.

14. The apparatus for assuring content of the product of claim 13, wherein said processor comprises a plurality of processors.

15. The apparatus for assuring content of the product of claim 13, wherein said processor is coupled to said memory with an internet connection.

16. The apparatus for assuring content of the product of claim 13, wherein said processor is coupled to said memory with a wireless connection.

17. The apparatus for assuring content of the product of claim 13, wherein said output device is a display.

18. The apparatus for assuring content of the product of claim 13, further comprising an input device that is configured to receive at least said plurality of key elements.

19. A program product for an apparatus having a processor, the program product comprising:
    software executable in the processor to:
        store a plurality of key elements that at least partially specify the content of the product, an assessment criteria for each of said plurality of key elements, a plurality of maturity levels for each of said assessment criteria that are used to at least partially assess a maturity of said content, a planned maturity level for each of said assessment criteria that comprise a relationship between said maturity and said plurality of maturity levels, an actual maturity level for said assessment criteria;
        calculate a difference between said actual maturity level and said planned maturity level of said assessment criteria;
        create at least one of said plurality of metrics based at least in part upon said difference;
        project a future maturity level for at least one of said assessment criteria based at least in part upon a statistical analysis of said plurality of metrics of said at least one of said assessment criteria;
        identify issues with said content of the product based at least in part upon said future maturity level; and
    signal-bearing media bearing said software.

* * * * *